(12) United States Patent
Vickers et al.

(10) Patent No.: US 12,546,819 B2
(45) Date of Patent: Feb. 10, 2026

(54) TECHNIQUES FOR DETECTING PROBE LANDING IN INTEGRATED CIRCUIT TESTING SYSTEMS

(71) Applicant: FEI Company, Hillsboro, OR (US)

(72) Inventors: James S. Vickers, San Jose, CA (US); Seema Somani, San Jose, CA (US); Brian Tilley, Anna, TX (US); Michael Berkmyre, Princeton, TX (US); Richard Stallcup, Frisco, TX (US)

(73) Assignee: FEI Company, Hillsboro, OR (US)

( * ) Notice: Subject to any disclaimer, the term of this patent is extended or adjusted under 35 U.S.C. 154(b) by 310 days.

(21) Appl. No.: 18/333,136

(22) Filed: Jun. 12, 2023

(65) Prior Publication Data

US 2024/0410937 A1   Dec. 12, 2024

(51) Int. Cl.
| | |
|---|---|
| *G01R 31/28* | (2006.01) |
| *H01J 37/24* | (2006.01) |
| *H01J 37/244* | (2006.01) |
| *H01J 37/28* | (2006.01) |

(52) U.S. Cl.
CPC ........ *G01R 31/2891* (2013.01); *H01J 37/244* (2013.01); *H01J 37/28* (2013.01)

(58) Field of Classification Search
CPC .... H01J 37/244; H01J 37/28; G01R 31/2891; G01R 1/06744; G01R 31/2831; G01H 9/00
See application file for complete search history.

(56) References Cited

U.S. PATENT DOCUMENTS

| | | | |
|---|---|---|---|
| 6,169,281 B1* | 1/2001 | Chen ...................... | G01Q 70/10 977/851 |
| 2008/0223119 A1* | 9/2008 | Phan ...................... | G01Q 20/02 73/105 |
| 2015/0377921 A1 | 12/2015 | Ukraintsev et al. | |
| 2017/0356931 A1* | 12/2017 | Humphris ............. | G01Q 20/00 |
| 2018/0061612 A1* | 3/2018 | Neuman ................ | G01V 1/001 |
| 2019/0353681 A1* | 11/2019 | Sadeghian Marnani ..................... G01Q 80/00 |  |
| 2021/0109126 A1* | 4/2021 | Baur ...................... | G01Q 30/02 |

* cited by examiner

*Primary Examiner* — Eman A Alkafawi
*Assistant Examiner* — Suresh K Rajaputra
(74) *Attorney, Agent, or Firm* — Leron Vandsburger (57) ABSTRACT

Systems, methods, and techniques for detecting a contact between a probe tip and a sample surface. A method can include dithering a probe in a plane substantially parallel with a surface using a periodic motion having a dither frequency. The method can include directing a beam of charged particles toward a region of the probe. The method can include generating detector data describing the periodic motion of the probe based at least in part on an interaction between the beam of charged particles and the region of the probe. The method can include displacing the probe toward the surface. The method can also include detecting a contact between the probe and the surface using the detector data.

21 Claims, 5 Drawing Sheets

TECHNIQUES FOR DETECTING PROBE LANDING IN INTEGRATED CIRCUIT TESTING SYSTEMS

TECHNICAL FIELD

Embodiments of the present disclosure are directed to electronic testing systems, as well as algorithms and methods for their operation. In particular, some embodiments are directed toward techniques for integrated circuit testing.

BACKGROUND

Integrated circuit (IC) testing involves measurement of individual transistors or groups of transistors of a semiconductor wafer or wafer section (e.g., a diced wafer), termed a "device under test" or DUT. Typically, probes are positioned in contact with integrated circuit elements and used to interrogate the DUT with a time-varying electrical signal. With increasing feature density and structural complexity of integrated circuits, placing probes onto specific IC elements involves precise positioning of nanoscale probe tips and developing nanoscale information for the probe tip position in three dimensions. Such precise positioning is a significant challenge for "open loop" positioning systems, for which a position of the probe tip is known to within a tolerance. The inexact location of the probe tip makes contact with the surface difficult to predict.

Precise positioning of probe tips onto conducting contacts at the nanometer scale, corresponding to a characteristic feature size of current CMOS nodes, presents significant challenges. For example, the surface of a typical DUT includes many features that are visibly similar. For at least this reason, the outline of a probe, and the probe tip in particular, can be difficult to distinguish against the background. As a result, it is impractical to deploy open loop positioning at the scale on which testing platforms are deployed, while using imaging-based contact detection methods. There is a need, therefore, for improved probe tip localization and contact detection for IC testing systems.

SUMMARY

Systems, methods, and techniques for detecting a contact between a probe tip and a sample surface. In an aspect, a method can include dithering a probe in a plane substantially parallel with a surface using a periodic motion having a dither frequency. The method can include directing a beam of charged particles toward a region of the probe. The method can include generating detector data describing the periodic motion of the probe based at least in part on an interaction between the beam of charged particles and the region of the probe. The method can include displacing the probe toward the surface. The method can also include detecting a contact between the probe and the surface using the detector data.

The method can further include determining an approximate position of a tip of the probe, included in the region of the probe. Determining the approximate position of the tip of the probe can include generating an electron image of the region of the probe and determining the approximate position of the tip of the probe using the electron image. Directing the beam can include scanning the beam of charged particles in a line over the region of the probe using a line-scan. A mathematical product of the dither frequency and a dwell time of the beam on a point in the line can be equal to or greater than unity. The dither frequency can be about equal to a resonance frequency of the probe.

The method can further include determining an approximate orientation of the probe and generating identifier information for the probe based at least in part on the orientation. The sample can include an integrated circuit having a contact pad, the contact being formed between the probe and the contact pad. Generating the detector data can include generating filtered data using a lock-in amplifier tuned to the dither frequency. Detecting the contact can correspond to an attenuation of an output of the lock-in amplifier at the dither frequency.

The method can further include dithering the probe over a set of motion frequencies, directing the beam of charged particles toward the probe, generating detector data describing a response of the probe to the motion frequencies based at least in part on the interaction between the beam of charged particles and the probe, estimating a resonance frequency of the probe using the detector data, and selecting the dither frequency to be about equal to the resonance frequency. Directing the beam of charged particles can include scanning the beam over the surface in a scan pattern. Estimating the resonance frequency can include isolating the resonance frequency using a lock-in amplifier. The set of motion frequencies can include an element frequency of 100 kHz.

Detecting the contact can include determining a phase of a frequency component in the detector data, the frequency component being at about the dither frequency. Detecting the contact can include aligning the phase of the frequency component to a phase of a drive signal of periodic motion and detecting a change in the frequency component or a change in the phase of the frequency component.

The probe can be a first probe, the periodic motion can be a first periodic motion, the dither frequency can be a first dither frequency, and the system further can include a second probe. The method can further include dithering the second probe in the plane substantially parallel with a surface using a second periodic motion having a second dither frequency at about a resonance frequency of the second probe. The method can further include directing the beam of the charged particles toward a region of the second probe. The method can further include generating detector data describing the periodic motion of the second probe based at least in part on an interaction between the beam of charged particles and the region of the probe. The method can further include displacing the second probe toward the surface. The method can further include detecting a contact between the second probe and the surface using the detector data. The first dither frequency and the second dither frequency can be different.

In an aspect, one or more non-transitory machine-readable storage media storing instructions that, when executed by a machine, cause the machine to perform operations of the method of the preceding aspect.

In an aspect, a system for testing integrated circuit components includes a probe, a charged particle beam system, a detector, oriented toward the probe and configured to detect particles generated by interaction of charged particles and the probe, control circuitry, operably coupled to the probe, the charged particle beam system, and the detector, and configured to actuate the probe, and one or more non-transitory machine-readable storage media storing instructions that, when executed by the system, cause the system to perform operations of the method and media preceding aspects. The charged particle beam system can be a scanning electron microscope column, and wherein the detector is a secondary electron detector or a backscattered electron detector.

Embodiments of the present disclosure also include systems, components, and methods in accordance with the preceding aspects. The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed can be resorted to by those skilled in the art, and that such modifications and variations are considered to be within the scope of this disclosure as defined by the appended claims.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the disclosure. In the forthcoming paragraphs, embodiments of an analytical instrument system, components, and methods to probe tip location and to detect contact between the probe tip and a surface are described. Embodiments of the present disclosure focus on integrated circuit characterization and failure analysis in the interest of simplicity of description. Embodiments are not limited to such instruments, but rather are contemplated for analytical instrument systems configured for localization and positioning of nanoscale electromechanical elements. In an illustrative example, nanoscale composites, such as quantum dot, MEMS devices, or other nanostructured materials, can benefit from improved localization of nanoscale electromechanical components that are otherwise difficult to position with suitable precision.

Embodiments of the present disclosure include systems, methods, algorithms, and non-transitory media storing machine-readable instructions for localizing and detecting a contact between a probe tip and a sample surface. Technical advantages of the present disclosure include improved detection of contact between nanoscale probe tips with surfaces without detailed information about sample surface position, as well as improved performance of integrated circuit evaluation platforms.

Integrated circuit testing involves measurement of individual transistors or groups of transistors of a semiconductor wafer or wafer section (e.g., a diced wafer), termed a "device under test" or DUT. Typically, probes are positioned in contact with integrated circuit elements and used to interrogate the DUT with a periodic, aperiodic, and/or direct current electrical signals. One or more probes are used as inputs and one or more probes are used as outputs to measure the response of the IC elements to the signal. With increasing feature density and structural complexity of integrated circuits, placing probes onto specific IC elements involves nanoscale geometries of probe tips and nanoscale information for the probe tip position. Such precise positioning is a significant challenge for "closed loop" positioning systems (e.g., registered piezoelectric actuators). While technically possible, precise positioning of probe tips onto conducting contacts at the nanometer scale, corresponding to a characteristic feature size of current CMOS nodes, can increase the complexity of control systems to an extent that it is impractical at the scale on which testing platforms are deployed. For example, based at least in part on uncertainty in sample topography and sample height measurements, closed-loop fine control systems can still rely on feedback mechanisms using the techniques of the present disclosure.

In place of complex closed-loop systems, embodiments of the present disclosure leverage the availability of electromechanical systems (e.g., arbitrary waveform generators, piezoelectric actuators, or the like) to induce a motion of the probe that is attenuated or removed at contact with a sample surface. Relative to existing techniques, embodiments of the present disclosure improve such detection at least in part based on isolating motion at or near a characteristic frequency of the probe motion, revealing the influence of contact with the surface on the probe. As an illustrative example, a contact between the probe tip and the surface can be detected at least in part by an image of the probe for which frequency-domain content has been filtered to isolate a periodic motion of the probe. Filtering in this way can be remove vibration at other frequencies and remove background (e.g., substantially stationary) information, which can be used to generate images that isolate an individual probe in a field of view that includes multiple probes. At contact, the periodic motion of the probe ceases, resulting in the disappearance of the probe from the image. As described in more detail in reference to FIGS. 1-6, embodiments of the present disclosure permit a probe tip to be precisely located and lowered onto nanoscale integrated circuit features, without detailed knowledge of the exact position of the surface of the IC or the geometry of the probe.

Figure 1:
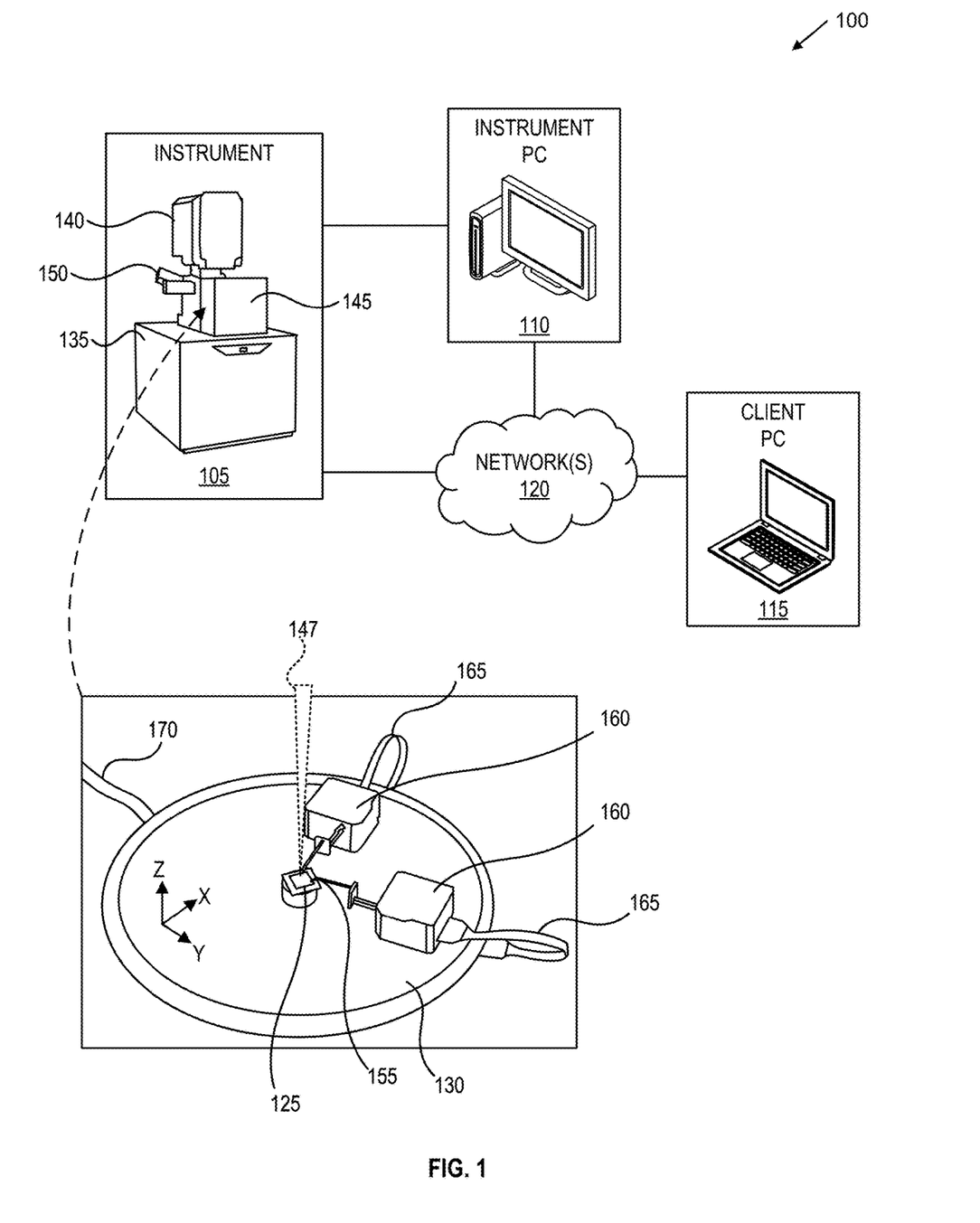
FIG. 1 is a schematic diagram illustrating an example integrated circuit testing system, in accordance with some embodiments of the present disclosure.

FIG. 1 is a schematic diagram illustrating an example integrated circuit (IC) testing system 100, in accordance with some embodiments of the present disclosure. The example system 100 includes an instrument 105, an instrument computing device (IPC) 110, and a client computing device 115, operably intercoupled via one or more networks 120. The example system 100 is configured to interrogate an IC device, termed a device under test (DUT) 125 using probe assembly 130, electronically coupled with components of the DUT 125 via a controller, also referred to as a test rig. Through application of time-varying electronic signals to components of the DUT 125, termed a "test loop," performance characteristics of circuit components of the DUT 125 can be derived as part of quality control and failure analysis techniques for ICs fabricated according to a given IC design.

The instrument 105 includes a test section 135 in which the probe assembly 130 is disposed, including the DUT 125 as well as the electronic components to drive the test loop (e.g., the test rig), vacuum components to isolate the DUT 125 from atmosphere, and thermal management systems to remove heat from the DUT 125 during testing. Coupled with the test section 135 are a charged particle column 140 and a vacuum chamber 145. The charged particle column 140 can be an ion beam (e.g., focused ion beam (FIB)) column or an electron beam column. In some embodiments, the instrument 105 includes a FIB column and an electron beam column with one of the charged particle sources being coupled with the vacuum chamber at an angle relative to the charged particle column.

An electron beam column can generate a beam of electrons 147 and focus the beam of electrons 147 onto the DUT 125. The interaction of the beam of electrons 147 with the DUT 125 gives rise to one or more detectable signals, which can be received by one or more detectors 150 operably coupled with the vacuum chamber 145 and configured to generate detector data based at least in part on measurement of the signal(s). In an illustrative example, the detector(s) 150 can include secondary electron detectors, backscattered electron detectors, photon detectors, imaging sensors (e.g., CCDs) or the like. In another example, the probe can obscure a bright spot on the DUT 125 surface, such that the signal can arise from the probe periodically revealing the bright spot and periodically blocking the beam 147 from reaching the surface. In contrast to a typical scanning electron microscope (SEM), the vacuum chamber 145 can omit sample manipulation tools, such as an interlock, sample stage, and the like, at least in part because the DUT 125 can be removably coupled with the probe assembly 130, which can be disposed on a stage, a cradle, or other retention assembly that provides electronic and thermal coupling with the test section (e.g., coupled with the test rig). The beam of electrons 147 can be directed toward the DUT 125 using various operational modes, including but not limited to imaging mode, line scan mode, and spot mode, as described in more detail in reference to FIGS. 2-6.

The probe assembly 130 can include individually addressable probes 155, movable in three spatial dimensions (labeled with "x-y-z" cartesian axes) by electromechanical actuators 160. In this way, probe tips (labeled 210 in reference to FIGS. 2-4) can be displaced toward a position on the surface of the DUT 125 with nanometer-scale precision. In some embodiments, the probe assembly 130 is electronically coupled with components of the test section 135 via couplings 165 and 170, by which the actuators 160 can be driven (e.g., using drive signals) and the output signals can be generated.

Based at least in part on challenges associated with calibrating a reference position of the DUT 125 surface (e.g., defining z=0 to be the surface of the DUT 125), vertical displacement of the probes 155 can be measured in reference to a calibration displacement (e.g., a return or "zero" displacement) that is independent of the type and position of the DUT 125. To that end, example system 100 can implement open-loop positioning of the probes 155, referring to an approach by which the position of the probes 155 is known in reference to the calibration displacement, adjusted by any subsequent displacements (e.g., a starting point in three-dimensional coordinates with each subsequent displacement added as a vector of three displacement values). In some cases, the lateral (e.g., "x-y") position of the probe(s) 155, relative to the surface of the DUT 125, can be determined using detector data, such as secondary electron images, generated by directing the beam of electrons 147 at a region of the DUT 125 or at one or more of the probes 155.

The computing devices 110 and 115 can be general-purpose machines (e.g., laptops, tablets, smartphones, servers, or the like) that are configured to operate or otherwise interact with the instrument 105. The instrument 105, in turn, can include electronic components that form part of a special-purpose computing device, including control circuitry configured to drive the test loop, actuate the probe assembly 130, control the electron beam column 140, and operate the vacuum systems and thermal management systems. The IPC 110 can be a machine provided with software configured to interface with the instrument 105 and to permit a user of the instrument 105 to conduct a test of the DUT 125. Similarly, the client pc 115 can be configured to control one or more systems of the instrument 105 (e.g., via the IPC 110 and/or by interfacing with the instrument 105 over the network(s) 120) to conduct a test of the DUT 125. In some embodiments, the instrument 105, the IPC 110, and/or the client PC 115 are in separate physical locations and are coupled via the network(s) 120 and/or by other means, such as direct connection or by wireless connection (e.g., near-field radio). The network(s) 120 can include public networks (e.g., the internet) and/or private networks (e.g., intranet or local area networks). In some embodiments, the IPC 110 and/or the client PC 115 is/are configured to operate the instrument autonomously (e.g., without human intervention) or semi-autonomously (e.g., with limited human intervention, such as initiating a test, identifying a sample, and/or confirming an automated analytical result). In this way, the example system 100 can be configured to operate with human control and/or autonomously, as part of a scalable IC characterization system for automated testing of ICs.

Figure 2:
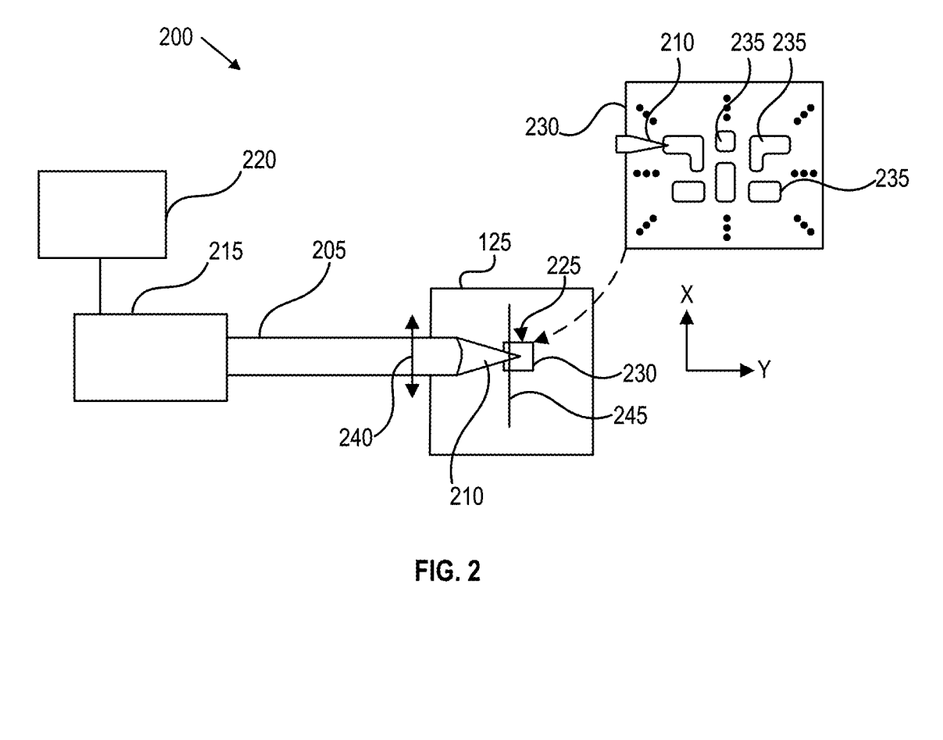
FIG. 2 is a schematic diagram illustrating an example integrated circuit testing probe in plan view, in accordance with some embodiments of the present disclosure.

FIG. 2 is a schematic diagram illustrating an example integrated circuit testing probe 200 in plan view, in accordance with some embodiments of the present disclosure. The probe 200 is an example of the probes 155 of FIG. 1. The probe 200 includes a probe arm 205 and a probe tip 210. The probe 200 also includes electromechanical actuator(s) 215 (e.g., actuators 160 of FIG. 1). The probe 200 can be operably coupled with control circuitry 220 (e.g., via couplings 165 and 170 of FIG. 1), as described in reference to FIG. 1.

Figure 3:
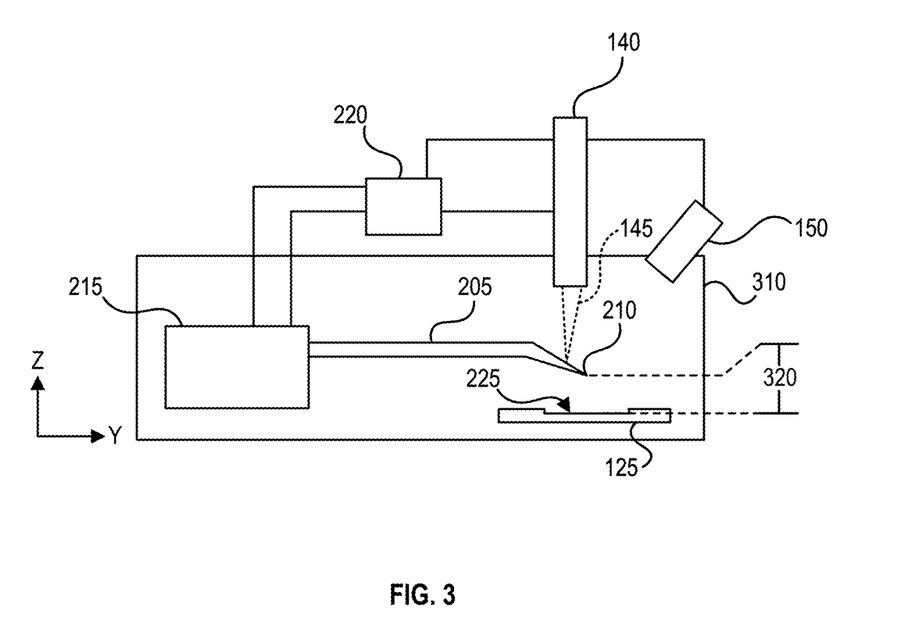
FIG. 3 is a schematic diagram illustrating an example integrated circuit testing probe in profile view, in accordance with some embodiments of the present disclosure.

The probe arm 205 and probe tip 210 can be fabricated from a conductive wire that has been shaped and sharpened to a point. As illustrated in FIG. 1 and FIG. 3, the probe tip 210 can be oriented at an angle relative to the probe arm 205, such that the tip 210 contacts the surface 225 of the DUT 125 in a target area 230. The probe tip 210 can taper to a terminal surface having a characteristic dimension on the same scale as one or more features 235 of the DUT 125 (e.g., on the order of 1-100 nm). The feature(s) 235 can be conductive and electronically coupled with one or more IC components (e.g., transistors, diodes, etc.). For example, the feature(s) 235 can include conductive contact pads formed in one or more layers of the IC that can be used to mechanically and/or electrically couple the probe(s) 205 with the IC components.

The probe tip 210 can be brought into contact with the surface 225 at a feature 235, electronically coupling the control circuitry 220 with the DUT 125. The coupling can permit a probe 200 to apply at least part of a test signal to the DUT 125 through a feature 235. In some embodiments, multiple probes 200 are contacted with multiple respective features 235 on the surface 225 and deployed concurrently to apply the test signals and to measure output signals. An example configuration with multiple probes 200 is described in reference to FIG. 4.

The control circuitry 220 can drive the actuator(s) 215 in one or more directions, for example, by encoding a motion of the probe 200 as a vector of displacement values. The motion can include a component of linear motion (e.g., a linear displacement in one or more directions) and/or a component of periodic motion, used to dither the probe 200. In this context, a "dither" motion refers to a periodic motion of the probe arm 205 and/or the probe tip 210 characterized by a frequency and an amplitude, where the amplitude, measured as a displacement of the probe tip 210 in a given dimension, can be on the order of the size of the feature(s) 235, larger, or smaller.

With open loop positioning systems, a displacement vector can be used to track the position of the probe tip 210 within a tolerance of about 10%. In this way, judging whether a contact of the probe tip 210 and the surface 225 has taken place can be prone to error. Similarly, raising the probe tip 210 from the surface (e.g., breaking contact) can be prone to error. Moving the probe tip 210 from one feature 235 to another feature 235 while the probe tip 210 is in contact with the surface 225 can damage the DUT 125 and/or the probe tip 210. As feature 235 sizes continue to shrink to the 1-10 nm scale, additional and/or alternative contact detection techniques are needed. Advantageously, techniques described herein permit detection of contact between the probe tip and the surface independently of the position of the probe tip 210 on the surface (e.g., not requiring an electrical contact with a precise point).

As part of detecting a contact between the probe tip 210 and the surface 225, techniques of the present disclosure can include dithering the probe arm 205 and the probe tip 210. In the context of the present disclosure, the term "dithering" is used to refer to a periodic and/or oscillatory motion, or dithering motion 240. In an illustrative example, the dithering motion 240 can be generated by applying a drive signal to the electromechanical actuator(s) 215. The drive signal can be a sinusoidal or other periodic signal having a frequency and a phase, referred to as a dither frequency. The dithering motion 240 can be substantially transverse to the orientation of the probe arm 205 (e.g., a lateral motion) or substantially aligned with the orientation of the probe arm 205 (e.g., a longitudinal motion). As part of increasing the detectability of the dithering motion 240, the probe 200 can be dithered in a plane substantially parallel with the surface 225 of the DUT 125 and/or in a direction substantially orthogonal to the beam of charged particles 147.

Advantageously, lateral motion can stimulate resonant and/or harmonic vibration modes of the probe arm to enhance the amplitude of the dithering motion 240. To that end, the dither frequency can be about the resonance frequency of the probe(s) 200. In general, the expression for the resonant frequency of a cantilever under lateral motion is:

$$f = \frac{k_n}{2\pi}\sqrt{\frac{E \cdot I}{wL^4}}$$

where $k_n$ is a constant specific to a resonant mode, E is the young's modulus, I is the moment of inertia, w is the width of the probe arm 205, and L is the length of the probe arm 205. As would be understood by a person of ordinary skill in the relevant art, E, I, w, and L are parameters that are specific to the material and the geometry of the probe arm 205 and the probe tip 210. Resonant properties are sensitive to the values of each parameter, such that relatively small deviations of the estimated values from actual values of the probe 200 can reduce or eliminate resonant motion in the probe 200.

To that end, techniques of the present disclosure include determining a resonant frequency of the probe 200. Determining the resonant frequency of the probe 200 can include dithering the probe 200 over a set of motion frequencies. In some cases, the set of motion frequencies can be determined based at least in part on an estimation determined using the expression above. In some cases, the response of the probe 200 to a sweep of motion frequencies can be measured using a charged particle microscope. For example, a beam of charged particles can be directed toward the probe 200 (e.g., the probe arm 205 and/or the probe tip 210). Detector data, in the case of as SEM, can include secondary electron images, backscatter electron images, line scan signals, current absorbed by the probe 200 from the beam and/or intensity data as a function of time. The detector data can be filtered by frequency to isolate frequency components corresponding a given motion frequency. In this way, the detector data can describe a response of the probe 200 to the motion frequencies, based at least in part on the interaction between the beam of charged particles and the probe 200. Determining the response of the probe 200 to each motion frequency of the set of motion frequencies can permit the resonance frequency of the probe 200 to be estimated from the detector data. The dither frequency can be selected to be about equal to the resonance frequency. In some embodiments, the dither frequency can be a fraction or a multiple of the resonance frequency. For example, the dither frequency can be selected to stimulate a harmonic vibrational mode of the probe 200, rather than the first resonant mode (n=1 in the expression above). Similarly, the dither frequency can be selected to be different from a resonant frequency, for example, based at least in part on performance constraints of the electromechanical actuator(s) 215. Where the dithering motion 240 induces a detectable signal in the detector data, contact can be detected without stimulating the resonant modes of the probe 200.

In some embodiments, the beam of charged particles can be scanned over a region of the probe 200 (e.g., the probe arm 205 and/or the probe tip 210) using a line-scan 245. A line scan can be a scan pattern defined by a vector connecting two termini that traverses the region of the probe 200. The beam can be repeatedly scanned over the probe, such that the line-scan 245 is characterized by a cycle time. The cycle time, excluding time between successive line-scans 245, can include an average dwell time of the beam on a given point on the surface 225. The dwell time can be determined based at least in part on the dither frequency, such that frequency content for the dithering motion 240 is captured by the beam. In some embodiments, the mathematical product of the dither frequency (having units of $sec^{-1}$) and the dwell time of the beam on a point in the line scan 245, such as the dwell time of the beam on a point on the probe surface, (having units of sec) is equal to or greater than unity (a unitless value). In some embodiments, the point in the line scan 245 can coincide with a feature of the probe 200 or the DUT 125 surface 225. In an illustrative example, for a dither frequency of about 100 kHz the dwell time can be about 10 μsec or greater. With respect to the frequency range, above a dither frequency of about 10 MHz, issues arise from electromagnetic effects such as conductance and/or impedance-induced losses in couplings (e.g., coupling 170 of FIG. 1) and electromechanical wear of actuators (e.g., actuators 215). In contrast, below a dither frequency of about 50 kHz, acquisition time for each probe position can reduce throughput and make the probing technique impractical on a large scale. In some cases, the cycle time for the line-scan 245 is about 20 msec to about 50 msec, corresponding to a spot size of about 1.2 nm-50 nm, including subranges, fractions, and interpolations thereof.

FIG. 3 is a schematic diagram illustrating the example integrated circuit testing probe 200 of FIG. 2 in profile view, in accordance with some embodiments of the present disclosure. FIG. 3 shows the probe arm 205, the probe tip 210, the actuator(s) 215, the control circuitry 220, the surface 225 of the DUT 125, as described in more detail in reference to FIG. 2, as well as other components including an imaging system 305 (e.g., an electron microscope, a focused ion beam source, and/or an optical microscope), a vacuum chamber 310 (e.g., an example of vacuum chamber 145 of FIG. 1), and one or more sensors 315 operably coupled with the probe 200.

In FIG. 3 the surface 225 is shown recessed into the DUT 125 to reflect that typically the features 235 are formed internal to the DUT 125, and are revealed by selective removal of material from the DUT 125 (e.g., by ion-beam milling or other etching processes). The probe tip 210 is shown at a displacement 320 from the surface 225. In some embodiments, example processes of the present disclosure include dithering the probe tip 210 and directing the electron beam over at least part of the probe tip 210, as described in reference to FIG. 2, concurrent with displacing the probe tip 210 toward the surface 225. Control circuitry 220 can include one or more electronic signal filters and other components to process signals generated by the detector(s) 150. For example, the filters can include one or more lock-in amplifier(s), bandpass filters, low-pass and/or high-pass filters, or the like, configured to isolate frequency components of the detector data attributable to the dithering motion 240. As displacement 320 decreases with the approach of the probe tip 210 toward the surface 225, the response signal(s) generated as an output of detector(s) 150 and/or the filter(s) can be stored, processed, and/or used by the control circuitry 220 to detect contact of the probe tip 210 with the surface 225. In the example of a lock-in amplifier, the control circuitry can be configured (e.g., provided with analog and/or digital components) to transform the time-sequence of intensity values generated by the detector(s) 150 during a scan pattern (e.g., line scan 245 of FIG. 2) into a frequency space and to filter out the frequency components that deviate from the dither frequency. In some cases, the deviation can be greater than 0.1%, greater than 0.5%, greater than 1%, greater than 2%, greater than 3%, greater than 4%, greater than 5%, greater than 10%, or greater than 25%, including fractions and interpolations thereof.

The beam of charged particles 147 can be directed toward a region of the probe 200 that can include the probe tip 210, as an approach for detecting the region of the probe 200 with the greatest magnitude of dithering motion 240. Additionally and/or alternatively to the line-scan and imaging modes, the beam of charged particles 147 can be focused onto an edge of the probe arm 205 or probe tip 210 in spot mode. The amplitude of the dithering motion 240 and the relative dimensions of the beam spot and the probe width (e.g., at or near the probe tip 210) can be such that the region of the probe traverses the beam of charged particles 147 twice during each period of the dithering motion 240. In this way, the frequency of interest for filtration can be about twice the dither frequency. Advantageously, a relatively higher sample frequency can enhance the separation of the characteristic signal of the dithering motion 240 from other sources of periodic noise (e.g., out-of-band acoustic and/or vibrational noise, EMI, or the like), such as those that can be attributable to electromagnetic interference from vacuum components (e.g., turbo-pump revolution), DUT test signals, line frequency, etc. Additionally and/or alternatively, the beam of charged particles 147 can be defocused to a size that is on the same order of magnitude as the probe tip dimensions (e.g., about 10-100 nm in a characteristic dimension). In this way, the motion of the probe can be captured in detector data while also reducing the exposure of the DUT surface 125 to charged particles (e.g., the flux of charged particles is reduced in terms of particles per area). Advantageously, this approach permits the contact to be detected with beam-induced contamination or damage being reduced or eliminated.

Figure 4:
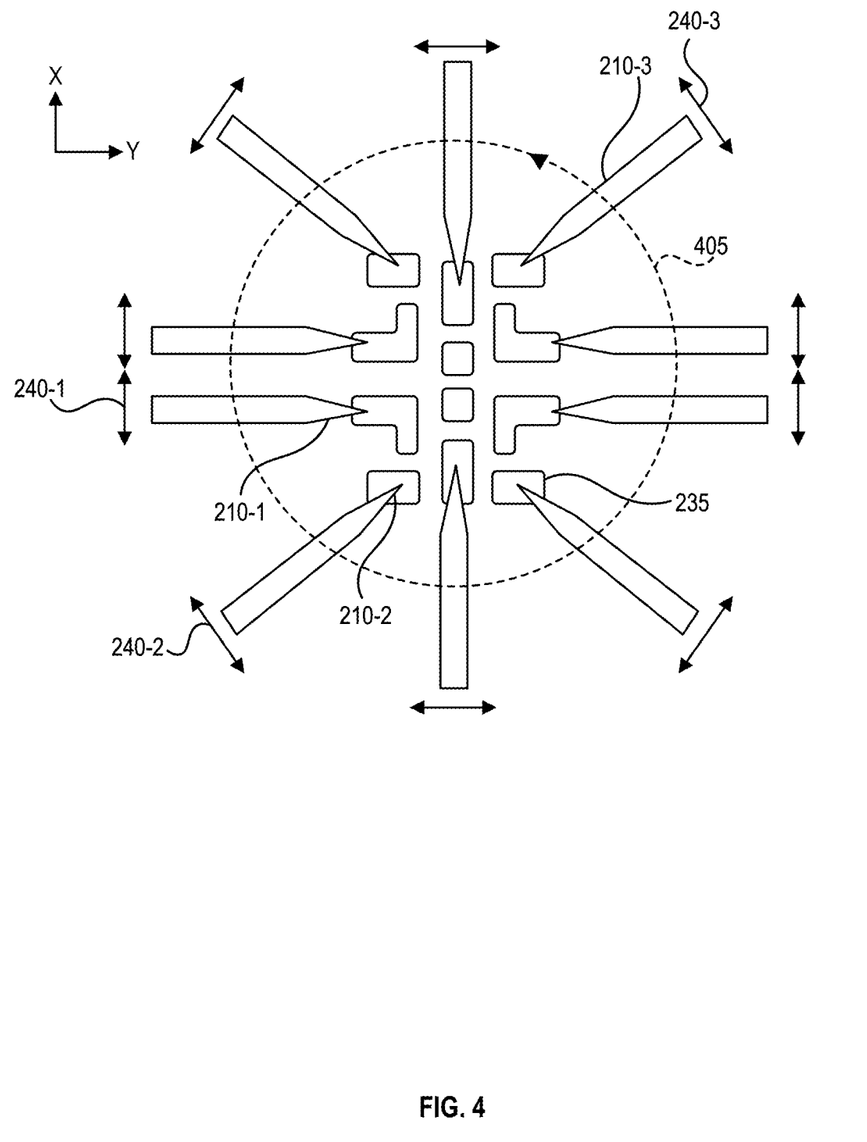
FIG. 4 is a schematic diagram illustrating an example integrated circuit testing system including multiple probes, in accordance with some embodiments of the present disclosure.

FIG. 4 is a schematic diagram illustrating an example integrated circuit testing system 400 including multiple probes, in accordance with some embodiments of the present disclosure. The probes of FIG. 4 are examples of the probes 155 and 200 of FIGS. 1-3. The system 400 illustrates ten individual probes that each make contact with a respective feature 235. For example, a first probe tip 210-1 can contact a first feature 235-1 and a second probe tip 210-2 can contact a second feature 235-2. The systems of the present disclosure can accommodate multiple probes, each individually employing the techniques described herein to detect proximity and/or contact with the surface of the DUT. The probe assembly (e.g., probe assembly 130 of FIG. 1) can accommodate 1-12 probes, including subranges and interpolations thereof.

In some embodiments, each probe 200 is driven at a respective dither frequency to induce a respective dithering motion 240. For example, a first probe can be driven using a first dithering motion 240-1 at a first dither frequency, a second probe can be driven using a second dithering motion 240-2 at a second dither frequency, and a third probe can be driven using a third dithering motion 240-3 at a third dither frequency. The dither frequencies can be the same, or different. Where the filtration method can resolve different frequencies within a tolerance of the resonant responses of the probes 200, the respective dither frequencies can be distinguishable and resonant. In some cases, the first dither frequency can be about equal to a first resonant mode, the second dither frequency can be equal to about the second resonant mode, etc. In some cases, the dither frequencies can be fractions or multiples of each other. In some cases, the dither frequencies can be determined in such a way to reduce crosstalk induced by transfer of vibration through the probe assembly (e.g., probe assembly 130 of FIG. 1). In an illustrative example, the respective dither frequencies can be selected to have irregular spacings that interfere in such a way that vibration does not propagate between probes.

Advantageously, applying different dither frequencies to respective probes can permit a single scan pattern 405 to discriminate between the probes in a common set of detector data on the basis of frequency. For example, by filtering frequency components of the detector data to isolate the different respective dither frequencies, the contact of each respective probe with the surface of the DUT can be detected in parallel. In contrast, for a single dither frequency, the scan pattern 405 can be labeled with position information that can be cross-referenced to identify a given probe. Such approaches can be limited by signal quality, as the change in signal intensity when a single probe makes contact can be relatively small against the signal generated by the remaining probes. Similarly, temporal resolution of the data can limit the ability to differentiate between probes that make contact with the surface of the DUT within a given period of time. As described in more detail in reference to FIG. 2 and FIG. 5, the scan pattern is illustrated as a substantially circular scan, but can also be or include one or more linear segments that can be continuous (e.g., a polygon) or discontinuous (e.g., a set of linear segments).

In some embodiments, the beam can be defocused to extend over the surface of the DUT 125 to capture motion information for multiple probes in detector data. In this way, detector data can include frequency-domain information for each of the respective dither frequencies, such that as a probe contacts the surface of the DUT, the frequency-domain information for the probe is eliminated from the detector data. Advantageously, this approach protects the surface by reducing the area-specific exposure of the surface to charged particles (e.g., for a given fluence, the flux is lower when the beam is defocused over a larger portion of the surface), while also permitting multiple probes to be monitored without localizing the probes individually by associating each of the probes with a respective dither frequency that is identifiable from detector data.

Figure 5:
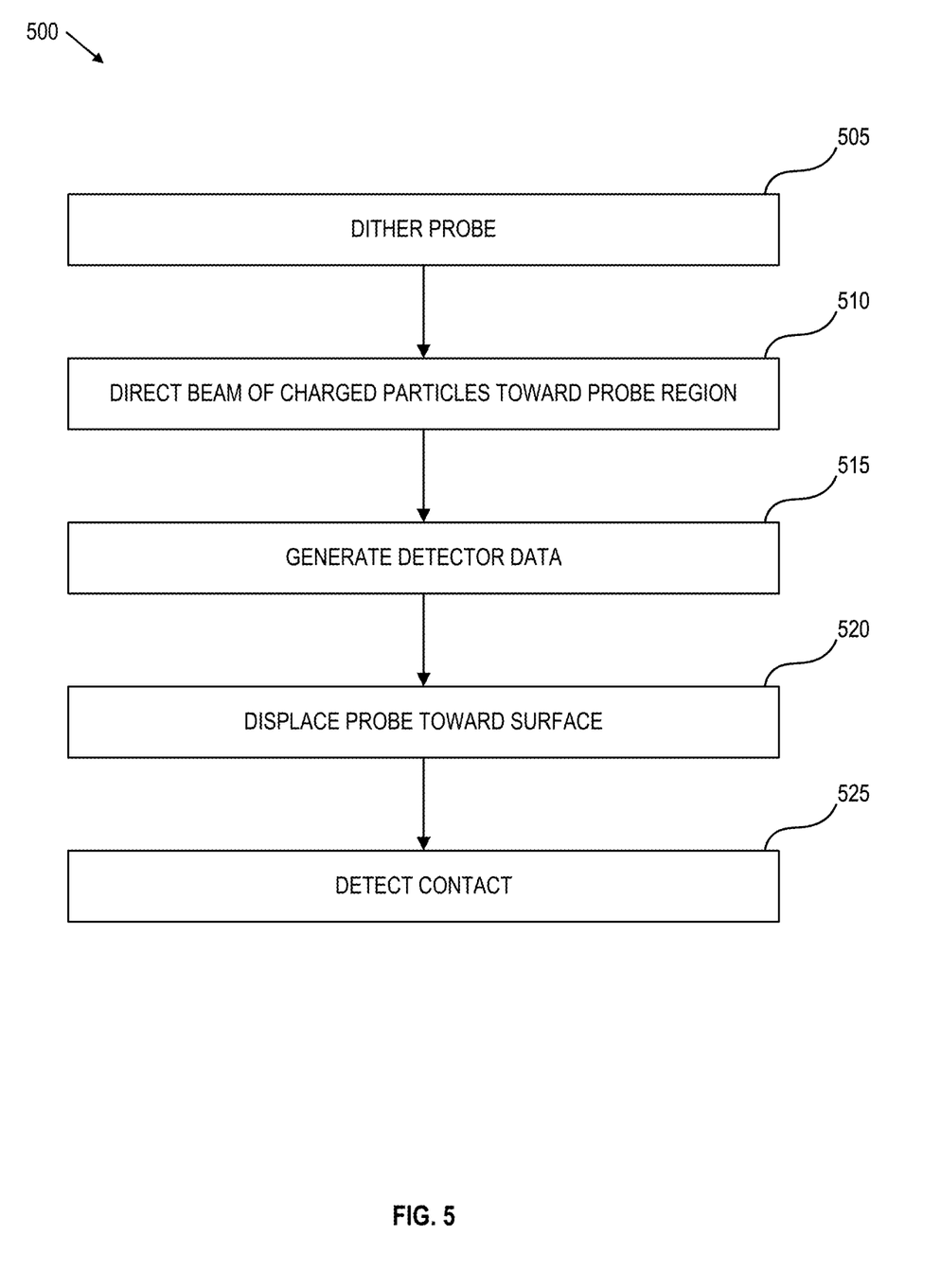
FIG. 5 is a block flow diagram illustrating an example process for detecting a contact between a probe tip and a surface, in accordance with some embodiments of the present disclosure.

FIG. 5 is a block flow diagram illustrating an example process 500 for detecting a contact between a probe tip and a surface, in accordance with some embodiments of the present disclosure. One or more operations of the example process 500 can be executed by a computer system in communication with additional systems including, but not limited to, characterization systems, network infrastructure, databases, and user interface devices. In some embodiments, at least a subset of the operations described in reference to FIG. 5 are performed automatically (e.g., without human involvement) or pseudo-automatically (e.g., with human initiation or limited human intervention). In an illustrative example, operations for positioning a probe tip, displacing the probe tip, dithering the probe, and generating detector data can be executed automatically, with the system 100 being configured to generate visualization data showing one or more response signals for interpretation by a human user (example shown in FIG. 6). While example process 500 is described as a sequence of operations, it is understood that at least some of the operations can be omitted, repeated, and/or reordered. In some embodiments, additional operations precede and/or follow the operations of example process 500 that are omitted for clarity of explanation, for example, operations for calibration of the electron source, alignment and aberration correction of the beam of electrons, initializing probe position or the like.

At operation 505, the example process 500 includes dithering a probe (e.g., probe 200 of FIG. 2). Dithering the probe can include generating a motion (e.g., dithering motion 240 of FIG. 2 and FIG. 4) that is at least partially transverse to the orientation of the probe. As described in more detail in reference to FIG. 2, the dithering motion can include a periodic component that is characterized by a dithering frequency. The dithering motion can be generated by applying a periodic drive signal to the electromechanical actuators (e.g., actuators 160 of FIG. 1) that also move the probe relative to the surface. In some embodiments, probe(s) include one or more actuators for generating the dithering motion, distinct from the electromechanical actuators used to move the probe. For example actuators for dithering can be designed to resonate at about the dither frequency, such that the energy used to drive the dithering motion can be relatively low in comparison to that used to drive the electromechanical actuators used to position the probes.

In some embodiments, operation 505 includes dithering multiple probes concurrently. As described in more detail in reference to FIG. 4, probes can be dithered at respective dithering frequencies, or phases, as an approach to discriminate between different probes. To that end, operation 505 can include dithering a first probe/probe tip (e.g., first probe tip 210-1) at a first dither frequency and dithering a second probe/probe tip (e.g., second probe tip 210-2) at a second dither frequency that can be different from the first dither frequency. Similarly, each probe can be dithered at a respective frequency for any number of probes (e.g., 4, 6, 8, 10, 12 probes, or more). For discussion of dither frequencies, reference is made to FIGS. 2-4. With synchronization of the detector signal processor to the beam scan pattern, multiple probes can be driven at substantially the same dither frequency, such that the a probe can use the same resonant or near-resonant dither frequency that is phase shifted relative to another probe using the resonant or near-resonant dither frequency. Detecting the phase of the probe dither motion permits discrimination between multiple probes as well as detecting contact of a given probe with the surface of the DUT. For example, detecting the contact can include determining a phase of the probe as captured in detector data, locking the phase of the appropriate frequency component at about the dither frequency in the detector data to the phase of the drive signal, and detecting a change in the amplitude and/or the phase of the frequency component, relative to the drive signal, as the probe approaches and/or contacts the DUT surface.

At operation 510, example process 500 includes directing a beam of charged particles (e.g., beam of electrons 147 of FIG. 1) toward a region of a probe. As described in more detail in reference to FIGS. 1-3, the beam of charged particles can be a beam of electrons and/or ions. In imaging mode, the beam can be directed over multiple probes and the DUT using a raster pattern, such that the frame rate in imaging mode will be compatible with sampling the dithering motion of the probe(s). For example, the frame rate can be greater than about half the dither frequency, to permit the dithering motion of the probe(s) to be detectable in a sequence of images of the probe(s). In another example, an image can be generated by integrating temporal information at each of a set of raster positions over a period of time. In this way, detector data are generated for multiple points at each of the set of raster positions and used to generate an image of probe contours without applying edge-detection algorithms. In an illustrative example, a probe can be dithered at about 91 kHz, with a beam of electrons used to sample the dither motion of the probe at a sampling frequency of 1 MHz for 100 data points, corresponding to a dwell time of 100μ sec at each position. The detector data for each position can be used processed (e.g., by transforming to frequency-domain and filtering) to isolate the 91 kHz mode. The magnitude of the 91 kHz mode can be used as the intensity value for each pixel in the image, which reproduces at least a portion of the periphery of the probe tip.

In some embodiments, directing the beam of charged particles includes scanning the beam over the surface of the DUT in a scan pattern. As described in more detail in reference to FIG. 4, the revolving pattern can correspond to a circular motion, a polygonal motion, or the like, such that the beam traverses the one or more probe(s) as one or more line scans. In the illustrative example of FIG. 4, the beam traverses ten probes (e.g., probes 205 of FIG. 4) in a circular motion, such that the beam passes over each probe in a line. In some cases, the scan pattern corresponds to a polygon having a number of sides equal to the number of probes for which example process 500 is to be implemented. While FIG. 4 includes ten probes, systems of the present disclosure can include more or fewer probes, such as four probes, six probes, eight probes, twelve probes, etc., including interpolations thereof. In another example, the scan pattern can include multiple discontinuous line scans (e.g., line scan 245 of FIG. 2), each oriented to pass the beam across a respective probe region. In some cases, each line scan of the scan pattern can be substantially orthogonal to the respective probe. Advantageously, using a scan pattern including multiple discontinuous line scans can reduce the overall flux of electrons incident on the surface of the DUT, thereby limiting degradation of surface features 235 (e.g., conducting contact pads of the IC, dielectric regions, etc.) caused by beam-induced contamination.

The beam can be focused onto the region of the probe and used in line-scan mode and/or spot mode, as described in more detail in reference to FIGS. 2-3. In this way, the motion of the probe(s) can be detected and used to identify a transition from free-vibration to anchored vibration. The region of the probe can include the probe tip. Advantageously, directing the beam toward the probe tip can improve detection of probe contact with the surface (e.g., surface 225 of DUT 125 of FIG. 2) by isolating the portion of the probe that exhibits the greatest motion extent. To that end, example process 500 can include determining an approximate position of the tip of the probe. Determining the approximate position of the tip of the probe can include generating one or more electron images of the probe and determining the approximate position of the tip of the probe using the electron image. Determining the approximate position of the probe tip can include automated and/or pseudo-automated geometric fitting methods applied to an image and/or contour of the probe in filtered frequency data. For example, a position of the probe tip can be approximated by fitting a line segment to each edge of a tapering portion of the probe, such that the convergence point of the line segments represents the position of the probe tip. In some embodiments, the position of the probe tip can be approximated by repeating a line scan over two or more positions of the tapered region of the probe. The probe tip can be located using estimates of the width of the probe at each line scan and an estimate of the distance between the line scans. In some cases, the edges of the probe can be identified in line-scan, which can be used to identify a leading edge and a trailing edge of the probe, as described in more detail in reference to FIG. 6D.

At operation 515, the example process 500 includes generating detector data. As described in more detail in reference to FIGS. 2-3 and in the examples of FIGS. 6A-6F, detector data can include one or more modalities describing the interaction of the beam of charged particles and the region of the probe. For example, the detector data can include a sequence of images generated using a secondary electron detector or a backscatter electron detector. In another example, the detector data can include a vector of intensity values (proportional to a flux of charged particles incident on a detector surface) and corresponding position values (e.g., in reference to a starting point). In spot mode, the detector data can include a time-series vector of intensity values, with each element of the vector separated by a time-step corresponding to the sampling frequency of the detector (e.g., detector(s) 150 of FIG. 1).

Operation 515 can include generating filtered data to isolate one or more frequency components of the charged particle detector. For example, the output signal from the detector can be filtered using a lock-in amplifier (e.g., as part of control circuitry 220 of FIGS. 2-3), using a bandpass filter configured to isolate the dither frequency, and/or using other filtering techniques adapted to selectively remove periodic components of detector signals attributable to sources other than the dithering motion of the probe. To that end, the intensity values in detector data can be transformed into frequency-space (e.g., using a Fourier transform, fast Fourier transform, or the like) to facilitate filtering by frequency. In this way, detector data can include a sequence of frequency-space intensity data for a set of time points, such that the intensity data can be represented as a function of frequency and time.

At operation 520, the example process 500 includes displacing the probe toward the surface. Displacing the probe tip can include engaging one or more individually addressable actuators (e.g., electromechanical actuators 160 of FIG. 1). In this way, operation 510 can include engaging one or more actuators such that a vector describing the displacement of the probe tip is nonzero in a dimension substantially normal to the surface of the sample and about equal to zero in other dimensions. In the example of a three-coordinate displacement vector, operation 510 can include applying a vector (X,Y,Z)=(0, 0, z), which "z" being a nonzero number. In some embodiments, the x-y coordinates (or their equivalent) are determined in reference to an image of the sample surface.

Operation 520 can include applying one or more displacement rates for the z-motion of the probe tip. For example, a first "coarse" motion rate can be greater than a second "fine" motion rate. In some embodiments, operation 510 includes reducing the displacement rate in the z-axis from the "coarse" rate to the "fine" rate when the estimated displacement (e.g., displacement 320 of FIG. 3) of the probe tip is from about 100 nm to about 1000 nm, including subranges, fractions, and interpolations thereof. Where the tolerance on the displacement is about 10%, reducing the displacement rate at a threshold distance can reduce the risk of damage to the probe(s) and/or the sample surface resulting from undesired contact.

At operation 525, the example process 500 includes detecting contact of the probe tip with the surface of the DUT. As described in more detail in reference to FIGS. 6A-6F, detecting the contact can include one or more approaches using detector data generated at operation 515. For example, where generating detector data includes generating filtered data using a lock-in amplifier tuned to the dither frequency, detecting the contact can correspond to an attenuation of an output of the lock-in amplifier at the dither frequency. In some cases, detecting the contact can include comparing the value of the lock-in output to a threshold value at which the probe tip is deemed to be in contact with the surface of the DUT.

Example 1: Probe Tip Landing on Device Surface

Figure 6A:
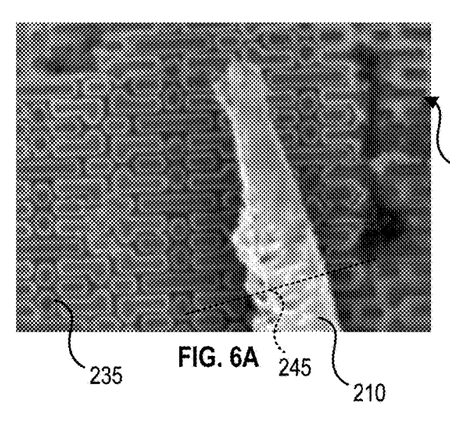
FIG. 6A is a composite diagram showing an example SEM image of an integrated circuit testing system over a DUT surface, in accordance with some embodiments of the present disclosure.
Figure 6B:
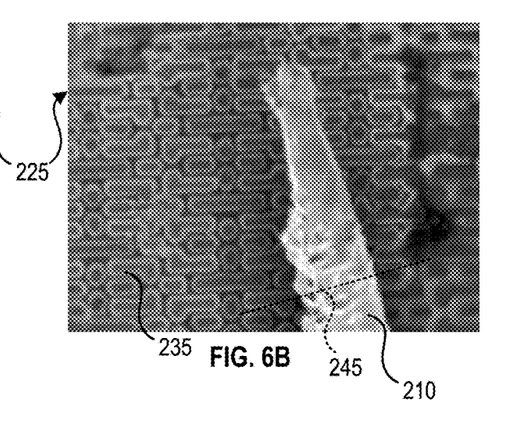
FIG. 6B is a composite diagram showing an example SEM image of the integrated circuit testing system in contact with the DUT surface, in accordance with some embodiments of the present disclosure.
Figure 6C:
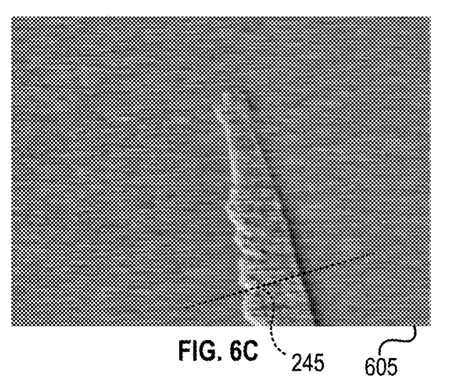
FIG. 6C is a composite diagram showing an example lock-in amplifier output image of the integrated circuit testing system over the DUT surface, in accordance with some embodiments of the present disclosure.
Figure 6D:
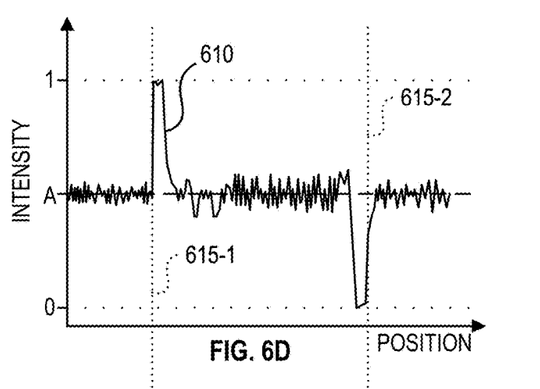
FIG. 6D is a graph showing an example lock-in amplifier output spectrum for the integrated circuit testing system over the DUT surface, in accordance with some embodiments of the present disclosure.
Figure 6E:
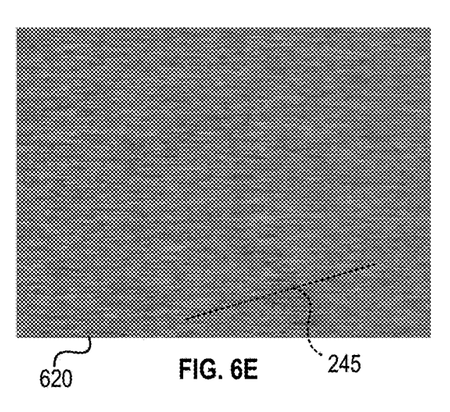
FIG. 6E is a composite diagram showing an example lock-in amplifier output image of the integrated circuit testing system in contact with the DUT surface, in accordance with some embodiments of the present disclosure.
Figure 6F:
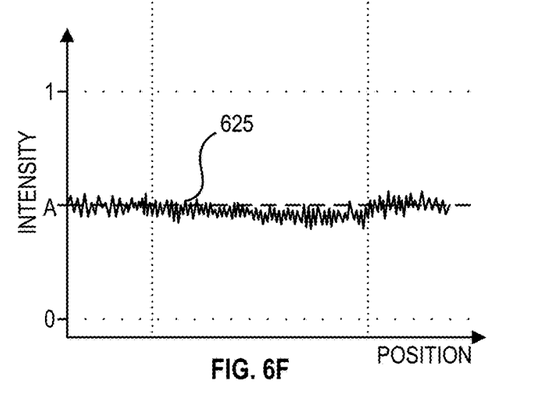
FIG. 6F is a graph showing an example lock-in amplifier output spectrum for the integrated circuit testing system in contact with the DUT surface, in accordance with some embodiments of the present disclosure.

FIGS. 6A-6F present example data from experimental embodiments of the present disclosure. FIGS. 6A-6B are composite diagrams showing an example SEM image of an integrated circuit testing system over a device surface (e.g., surface 225 of FIG. 2) and in contact with the device surface, respectively. FIG. 6C and FIG. 6E are composite diagram showing an example lock-in amplifier output image of the integrated circuit testing system over the DUT surface and in contact with the DUT surface, respectively. FIG. 6D and FIG. 6F are graphs showing example lock-in amplifier output spectra for the integrated circuit testing system over the DUT surface and in contact with the DUT surface, respectively. The images and data presented in FIGS. 6A-6F are illustrative examples, not intended to limit the scope of the present disclosure. Instead, the images and data are presented to demonstrate the improved contact detection afforded by the techniques of the present disclosure.

As illustrated in FIGS. 6A-6B, the environment of probe tip 210 can include relatively dense visual information, such as multiple features 235, surface particles, shadows, charging regions, and edges that together obscure the shape, contours, and/or shadows of the probe tip 210. As a result, it can be difficult to make a visual determination of contact between the probe tip 210 and the surface 225 of the DUT 125. In some cases, the probe tip 210 can have a rough or otherwise irregular surface that can be formed by surface accumulation (e.g., carbon contamination or other deposits) and/or as a result of the fabrication process, which can further complicate visual determination of contact with the DUT surface 225. As an illustrative example, FIG. 6B shows little visibly discernible difference from FIG. 6A, but nonetheless represents the probe tip 210 in contact with the surface 225.

The image 605 in FIG. 6C can be generated from a SEM data at least in part by filtering frequency information at about the dither frequency and/or multiples of the dither frequency. For example, pixel-wise frequency information from a sequence of SEM images can be sampled by generating time-series data for the intensity of a given pixel. Determining frequency-space information (e.g., by digital signal processing techniques, such as Fourier transform techniques) can isolate the dithering motion 240 of the probe tip 210 relative to the surface 225 of the DUT 125 that does not vibrate at the same frequency or frequencies. As shown, the filtered frequency information generates a relief image of the probe tip 210 against a background of arbitrary-mean noise. Comparable spectral data 610 can be generated using the line-scan 245, represented in the spectrum of FIG. 6D, where the edges 615 of the probe tip 210 are indicated in intensity data by local maxima (e.g., peaks and troughs) in the spectral data. In FIG. 6D, the spectrum is shown with e-beam shadows resulting from the orientation of the detector (e.g., detector 150 of FIG. 1) relative to the probe tip 210. In this context, "shadow" refers to the tendency for secondary electron signals from surfaces facing toward the detector to be brighter, relative to signals from surfaces facing away from the detector. In this way, the spectral data 610 includes a peak at a leading edge 615-1 that is brighter than the arbitrary-mean background, "A," and a peak at a trailing edge 615-2 that is darker than the background.

In some embodiments, the electron beam (e.g., beam of charged particles 147 of FIG. 1) can be directed at an edge 615 of the probe tip 210, for example, in spot mode, such that the dithering motion 240 of the probe tip repeatedly brings the edge 615 of the probe tip under the beam spot. In this way, the frequency of the intensity data can be a multiple of the dither frequency and the magnitude can be a scalar value generated as a function of time, for which the magnitude of the value indicates whether the probe tip 210 is in contact with the surface 225 of the DUT 125. This approach is also described in reference to FIGS. 2-5. In terms of the spectral data 610, spot mode information can be understood as a vector of intensity values for an edge 615 for which each element of the vector is the filtered frequency information at a given time.

FIGS. 6E-F present a second image 620 of frequency data and corresponding spectral data 625 at about the dither frequency or a multiple of the dither frequency. In contrast to the image 605 and the spectral data 610, the probe tip 210 is absent from the second image 620 and the spectral data 625 indicates a slight shadow of the probe tip 210 in the vicinity of the trailing edge 615-2. Based at least in part on the anchoring of the probe tip 210 to the surface 225 upon contact, the free vibration of the probe tip 210 at about the dither frequency and/or at a multiple of the dither frequency was substantially eliminated, as indicated by the absence of peaks 610 in the spectral data 625. In some cases, some vibration from the dithering motion can remain, such that detecting contact can include comparing the intensity of a peak 610 intensity value in the image 605, spectrum 610, or scalar value as a function of time, with a threshold below which the probe is deemed to be in contact with the surface. In some embodiments, a probe signal can be used to determine whether a conductive coupling is established.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on integrated circuit testing systems, and multi-probe systems in particular, these are meant as non-limiting, illustrative embodiments. Embodiments of the present disclosure are not limited to such embodiments, but rather are intended to address analytical instruments systems for which a wide array of material samples can be analyzed by probes of the present disclosure, such as micro-biological samples (e.g., for physiological measurements) and/or nanostructured samples.

Some embodiments of the present disclosure include a system including one or more data processors and/or logic circuits. In some embodiments, the system includes a non-transitory computer readable storage medium containing instructions which, when executed on the one or more data processors and/or logic circuits, cause the one or more data processors and/or logic circuits to perform part or all of one or more methods and/or part or all of one or more processes and workflows disclosed herein. Some embodiments of the present disclosure include a computer-program product tangibly embodied in non-transitory machine-readable storage media, including instructions configured to cause one or more data processors and/or logic circuits to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially" are used to indicate a deviation from the stated property within which the deviation has little to no influence of the corresponding function, property, or attribute of the structure being described. In an illustrated example, where a dimensional parameter is described as "substantially equal" to another dimensional parameter, the term "substantially" is intended to reflect that the two parameters being compared can be unequal within a tolerable limit, such as a fabrication tolerance or a confidence interval inherent to the operation of the system. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. For numerical values, such as diameters, lengths, widths, or the like, the term "about" can be understood to describe a deviation from the stated value of up to ±10%. For example, a dimension of "about 10 mm" can describe a dimension from 9 mm to 11 mm.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims. Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A computer-implemented method for detecting a contact between a probe tip and a sample surface, the method comprising: dithering a probe in a plane substantially parallel with a surface using a periodic motion having a dither frequency; directing a beam of charged particles toward a region of the probe; generating detector data describing the periodic motion of the probe based at least in part on an interaction between the beam of charged particles and the region of the probe; displacing the probe toward the surface; and detecting a contact between the probe and the surface using the detector data,
    wherein generating the detector data comprises generating filtered data using a lock-in amplifier tuned to the dither frequency, and wherein detecting the contact corresponds to an attenuation of an output of the lock-in amplifier at the dither frequency.

2. The computer-implemented method of claim 1, further comprising determining an approximate position of a tip of the probe, included in the region of the probe.

3. The computer-implemented method of claim 2, wherein determining the approximate position of the tip of the probe comprises: generating detector data describing the region of the probe; and determining the approximate position of the tip of the probe using the detector data.

4. The computer-implemented method of claim 1, wherein directing the beam comprises scanning the beam of charged particles in a line over the region of the probe using a line-scan.

5. The computer-implemented method of claim 4, wherein a mathematical product of the dither frequency and a dwell time of the beam on a point in the line is equal to or greater than unity.

6. The computer-implemented method of claim 1, further comprising:
    determining an approximate orientation of the probe; and
        generating identifier information for the probe based at least in part on the orientation.

7. The computer-implemented method of claim 1, wherein the sample includes an integrated circuit having a contact pad, the contact being formed between the probe and the contact pad.

8. The computer-implemented method of claim 1, further comprising: dithering the probe over a set of motion frequencies; directing the beam of charged particles toward the probe; generating detector data describing a response of the probe to the motion frequencies based at least in part on the interaction between the beam of charged particles and the probe; estimating a resonance frequency of the probe using the detector data, and selecting the dither frequency to be about equal to the resonance frequency.

9. The computer-implemented method of claim 8, wherein directing the beam of charged particles comprises scanning the beam over the surface in a scan pattern.

10. The computer-implemented method of claim 8, wherein estimating the resonance frequency comprises isolating the resonance frequency using a lock-in amplifier.

11. The computer-implemented method of claim 8, wherein the set of motion frequencies includes an element frequency of 100 kHz.

12. One or more non-transitory machine-readable storage media storing instructions that, when executed by a machine, cause the machine to perform operations comprising:

dithering a probe in a plane substantially parallel with a surface using a periodic motion having a dither frequency; directing a beam of charged particles toward a region of the probe; generating detector data describing the periodic motion of the probe based at least in part on an interaction between the beam of charged particles and the region of the probe; displacing the probe toward the surface; and detecting a contact between the probe and the surface using the detector data, wherein generating the detector data comprises generating filtered data using a lock-in amplifier tuned to the dither frequency, and wherein detecting the contact corresponds to an attenuation of an output of the lock-in amplifier at the dither frequency.

13. The one or more media of claim 12, wherein the dither frequency is about equal to a resonance frequency of the probe.

14. The one or more media of claim 12, wherein a mathematical product of the dither frequency and a dwell time of the beam on a point is equal to or greater than unity.

15. The one or more media of claim 12, wherein the operations further comprise:
dithering the probe over a set of motion frequencies; directing the beam of charged particles toward the probe; generating detector data describing a response of the probe to the motion frequencies based at least in part on the interaction between the beam of charged particles and the probe; estimating a resonance frequency of the probe using the detector data, and selecting the dither frequency to be about equal to the resonance frequency.

16. A system for testing integrated circuit components, the system comprising: a probe; a charged particle beam system; a detector, oriented toward the probe and configured to detect particles generated by interaction of charged particles and the probe; control circuitry, operably coupled to the probe, the charged particle beam system, and the detector, and configured to actuate the probe; and one or more non-transitory machine-readable storage media storing instructions that, when executed by the system, cause the system to perform operations comprising: dithering the probe in a plane substantially parallel with a surface using a periodic motion having a dither frequency at about a resonance frequency of the probe; directing a beam of the charged particles toward a region of the probe;
generating detector data describing the periodic motion of the probe based at least in part on an interaction between the beam of charged particles and the region of the probe; displacing the probe toward the surface; and detecting a contact between the probe and the surface using the detector data, wherein generating the detector data comprises generating filtered data using a lock-in amplifier tuned to the dither frequency, and wherein detecting the contact corresponds to an attenuation of an output of the lock-in amplifier at the dither frequency.

17. The system of claim 16, wherein the charged particle beam system is a scanning electron microscope column, and wherein the detector is a secondary electron detector or a backscattered electron detector.

18. The system of claim 16, wherein detecting the contact comprises: determining a phase component and a frequency component in the detector data, being attributable to the periodic motion of the probe; aligning the phase component to a phase of a drive signal of the periodic motion; and detecting a change in the frequency component or a change in the phase component of the detector data, relative to the drive signal.

19. The system of claim 16, wherein the probe is a first probe, the periodic motion is first periodic motion, the dither frequency is a first dither frequency, and wherein the system further comprises a second probe, and wherein the operations further comprise: dithering the second probe in the plane substantially parallel with a surface using a second periodic motion having a second dither frequency at about a resonance frequency of the second probe; directing the beam of the charged particles toward a region of the second probe; generating detector data describing the periodic motion of the second probe based at least in part on an interaction between the beam of charged particles and the region of the probe; displacing the second probe toward the surface; and detecting a contact between the second probe and the surface using the detector data.

20. The system of claim 19, wherein the first dither frequency and the second dither frequency are not equal.

21. The system of claim 16, wherein the operations further comprise:
dithering the probe over a set of motion frequencies; directing the beam of charged particles toward the probe; generating detector data describing a response of the probe to the motion frequencies based at least in part on the interaction between the beam of charged particles and the probe; estimating a resonance frequency of the probe using the detector data, and selecting the dither frequency to be about equal to the resonance frequency.

* * * * *